Figure 1:
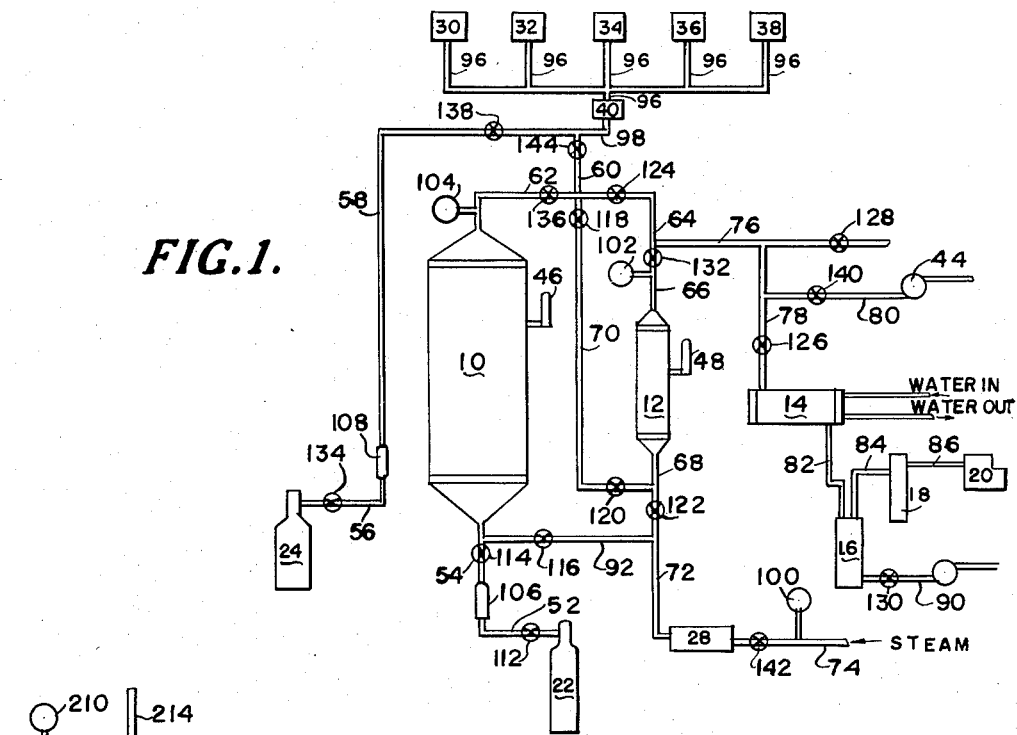

Sept. 8, 1959     M. BONOTTO     2,903,359
PROCESS FOR COFFEE

Filed Sept. 30, 1958     2 Sheets-Sheet 1

INVENTOR
MICHELE BONOTTO
BY Cushman, Darby & Cushman
ATTORNEYS

Sept. 8, 1959　　　　M. BONOTTO　　　2,903,359
PROCESS FOR COFFEE
Filed Sept. 30, 1958　　　　　　　　2 Sheets-Sheet 2

INVENTOR
MICHELE BONOTTO

BY Cushman, Darby & Cushman
ATTORNEYS

United States Patent Office 2,903,359
Patented Sept. 8, 1959

2,903,359

PROCESS FOR COFFEE

Michele Bonotto, Princeton, N.J., assignor of one-half to McCormick & Company, Incorporated, Baltimore, Md., a corporation of Maryland, and one-half to Reginald M. Webster and Joseph Gola, Jr., both of New York, N.Y., and to said Bonotto, jointly Application September 30, 1958, Serial No. 764,431

8 Claims. (Cl. 99—71)

This invention relates to the art of coffee-making and, more specifically, is directed to improvements in the production of instant coffee products and the isolation of aromatic fractions from roasted coffee.

In recent years, a number of various chemical agents and compounds, considered to be constituents of the flavor, body, acidity and aroma present in roasted coffee and roasted coffee beverages, have been isolated in discrete form and identified. Various workers have isolated various numbers of ingredients, up to as many as forty or more. The quantitative and qualitative analysis of all of these components varies somewhat, of course, with the variety of green coffee and the degrees of roasting as well as the testing method.

The majority of these chemical compounds have high vapor pressure, i.e. low boiling points, and this is especially true of those materials generally credited with giving the coffee its aroma, acidity, and body. On the other hand, however, the chemical compounds which constitute the flavoring and coloring portion of coffee and coffee brews have been found to be more stable and higher boiling. Although the identification of these chemical compounds in the aromatic principles of coffee has a very high scientific and academic value, it is only of mild interest to commercial manufacturers of instant coffee.

However, the loss or absence of the complex of these low-boiling point constituents is noticed whenever a cup of coffee is reconstituted from the instant coffee product and is organoleptically tested. In particular, loss of the aromatic principles responsible for flavor, body, acidity, and aroma accounts for the difference in taste found in a cup of coffee brewed from regular ground coffee and the brew produced by dissolving an instant coffee in water.

Hereinafter, for the sake of brevity, a coffee extract prepared in powder form, as by spray-drying or equivalent means, will be called "dry instant" coffee, and an extract prepared in a fluid concentrated form will be called "liquid instant" coffee. In addition, as will be discussed more fully hereinafter, I will define the aromatic principles of coffee as two fractions: those compounds in the complex causing the characteristic roasted coffee aroma will be referred to as the "caffeol fraction," and the components in the complex which convey the body and acidity which is characteristic of brewed coffee but missing from instant coffee, is called the "acid-bodies fraction."

In recent years, the manufacturing techniques for the preparation of instant coffees have improved so that on examining the several instant coffee products presently on the market, I find that, because of these latest technical developements, the loss of the original "caffeol fraction" is appreciably reduced and held to a minimum. I have found that, when a dry instant coffee produced by carefully controlled spray-drying is dissolved in water at about 200° F., to produce a cup of coffee, the characteristic odor of roasted coffee is still present, although not as strong as it is in freshly brewed coffee. These tests indicate that, while some of the original caffeol fraction has been lost, this has not taken place to such a degree as to affect the acceptability of the cup of coffee, and the characteristic odor of roasted coffee attributed to this caffeol fraction is still present. Thus, when a coffee beverage prepared from the instant coffee is compared with a brew produced in the conventional way from ground freshly-roasted coffee, the difference between the two to the consumer is not in the lack of aroma, but rather in the somewhat thinner body which gives the instant coffee brew a flat watery taste. This difference is easily detected not only by professional coffee tasters but also by the ordinary consumer.

From the above observations, it is evident that preservation of the caffeol fraction to a sufficient degree in the dry or liquid instant coffee is now not very difficult when the latest developments in chemical engineering are followed during their production. On the other hand, the acid-bodies fraction, which is responsible for the body and acidity of the coffee beverage, is lost in such production of instant coffees, and avoiding this loss seems to be impossible. It is to the recovery of this acid-bodies fraction and its utilization in preparing a superior and improved instant coffee product that the present invention is primarily directed.

In the prior art and in the literature, there are, of course, a number of examples of processes for the recovery of all of the aromatic volatile components released from roasted coffee, which components are then to be re-incorporated into dry or liquid instant coffee. For instance, attempts have been made to extract the volatile aromas from roasted coffee with various solvents with subsequent elimination and recovery of such solvents from the coffee and from the extract, followed by reincorporation of the recovered volatiles into the desired final product. Other processes employ a dry distillation procedure where, for instance, the roasted coffee is distilled and the aromatic distillate collected for later return to the instant product. The volatile aromas are fractionally condensed at different decreasing temperatures, finally down to the temperature of liquid nitrogen. Other processes are directed to methods for bringing the aroma of freshly roasted coffee through a liquid absorbing medium as, for instance, water or cold coffee solution by means of a current of inert gas or air. In other cases, a steam distillation technique has been used at atmospheric or elevated pressures where the coffee is in effect subjected to an in situ aqueous extraction, with the aqueous extract simultaneously distilled out during the steam distillation. All of these methods are proposed mainly in an attempt to recover the caffeol fraction, and sometimes, the caffein, but in any event, the coffee was generally stripped of all of its aromatic principles.

In some cases, the condensate resulting from the concentration of the coffee brew prior to spray-drying, to form dry instant coffee, has been used to extract the next or succeeding batches of coffee preparatory to their concentration. This is done to avoid the concentration and/or rectification operation of the condensate necessary to obtain the recovered volatile acids and aromas in concentrated form, suitable for a latter re-addition to the extracted coffee, which operation would require very exacting fractionating, rectification, and concentration apparatus. Even in these instances, the acid-bodies fraction is still lost.

While some of the above-discussed prior attempts, generally illustrative of the prior art, produced a cup of coffee approaching the characteristics found in freshly brewed coffee, in many instances, the improved results thus obtained have not generally warranted the additional cost of the product in the minds of the consumers, and the body-giving acid-bodies fraction remained a lost component. It will be seen that predominantly, the previous processes were operated on the principle of removing and recovering all of the aromatic fractions; this is now no longer a desirable approach since the caffeol fraction can be retained in the instant coffee product without separate isolation and reincorporation.

It is the object of this invention to provide a process for the selective isolation and recovery of the previously lost or uneconomically recoverable acid-bodies fraction. This objective of my invention is achieved by providing a process which separately strips and recovers the acid-bodies fraction from the beans and leaves behind the caffeol fraction.

A specific object of this invention is to provide a process for the recovery of the acid-bodies fraction from the ground roasted coffee beans by a two-phase steam treatment thereof under reduced pressures wherein the acid-bodies fraction only is removed, the caffeol fraction remaining substantially in the coffee.

Another specific object of this invention is to provide a process wherein the acid-bodies fraction normally lost to the atmosphere of the coffee-making plant can be recovered by selective adsorption of the volatiles contained in the plant's atmosphere followed by selective desorption of this acid-bodies fraction.

Still another specific object of this invention is to provide a process wherein acid-bodies fraction lost during evaporation of the concentrated coffee brew to be used for the preparation of dry or liquid instant coffee is recovered by physical adsorption and subsequent selective desorption in a concentrated form adapted to be immediately reconstituted into the instant product.

In addition, it is an object of this invention to incorporate with the processes described in the above-mentioned objects, the use of a reducing gas during the stripping treatment of the coffee or concentrated brew to aid in the recovery of the acid-bodies fraction as well as to otherwise improve the taste characteristics of the instant coffee product.

I have discovered that the acid-bodies fraction of the roasted coffee bean can be separately isolated and readily recovered in an aqueous concentrate by a novel economical and commercially feasible process. I have further discovered that the acid-bodies fraction can be separated and recovered from roasted coffee without extracting the caffeol fraction. Furthermore, I have discovered that ground roasted coffee, after the selective removal of the acid-bodies fraction by my process can then be water-extracted and the extract converted into dry instant or liquid instant coffee with full coffee aroma and flavor. In addition, I have discovered that the acid-bodies fraction can be separated and recovered from a coffee brew when subjected to concentration or evaporation processes. I have also discovered that the acid-bodies fraction separated and recovered according to the novel process of my invention may be re-incorporated into dry instant or liquid instant coffee to give them the characteristic body and acidity of a freshly brewed coffee, eliminating the flatness of taste previously mentioned. In particular, the re-incorporation of my recovered acid-bodies fraction into dry instant or liquid instant coffee leads to a product which on forming a brew possesses the "after taste" normally associated with freshly-brewed coffee beverage, but characteristically absent from instant coffee beverages.

As indicated, one embodiment of my invention utilizes a steam treatment of ground roasted coffee beans. In processes previously employed and designed to liberate and recover the volatile aromas of coffee by a steam distillation technique, the operation was always performed in a three-phase system, namely one where there were liquid, solid, and gaseous phases, and/or the operation was conducted at substantially atmospheric or greater pressures. In other words, previous processes used a brew and/or a slurry of coffee and water through which steam was injected and the volatile components carried off by the steam were conveyed therewith to a condenser and recovered along with the condensed steam. In other instances, steam was delivered and condensed through a column of coffee grounds, the excess of steam carrying with it the volatile aromas and then was conveyed to a condenser and condensed. In the so-called dry distillation techniques previously used, the coffee contained in a closed vessel was heated by some outside source of heat and the volatile vapors thus developed condensed at different temperatures thus producing different liquid fractions. In some of these cases, the operation was carried out without introduction of additional steam, but in the presence of water, really as in situ three-phase steam distillation. When the volatile components were to be recovered by absorption, the aromas were swept out of the ground coffee by air or inert gas, conducted to a chamber where they were contacted with a cooled coffee solution, as by spraying, to condense or absorb the aromas within the solution.

I have discovered that, by using a two-phase steam distillation only, i.e., by excluding the liquid phase, and by operating at reduced pressure under the conditions specified hereinafter, I can recover the desired acid-bodies fraction while leaving behind in the roasted coffee the caffeol fraction.

I have also discovered that the acid-bodies fraction, removed from the coffee by means other than dry steam, may also be selectively recovered by desorption after causing it to be adsorbed on a solid adsorbent, as described hereinafter, whether or not additional aromatic fractions were in the volatiles. When a current of steam is then passed through the adsorbent, the acid-bodies fraction is selectively desorbed, or liberated and can then be condensed and recovered in an aqueous solution in very high concentration as compared with the concentration of volatiles and aqueous solution obtained by prior methods, or it can be leached from the adsorbent medium by the use of a proper solvent, such as water, alcohols, e.g., ethyl alcohol, or ethers, e.g., ethyl ether.

Up to the present, the liquid instant coffee offered on the market has been of relatively low concentration, namely from 30% to 40% coffee solids. Such concentrations without the use of evaporators are the result of high efficiency of modern extractors, which in some cases, can directly deliver an extract containing about 40% solids. The product resulting from my present invention is a new super-density fluid coffee concentrate containing 55% to 72%, or more, coffee solids.

It is, therefore, still a further object of this invention to provide a liquid instant coffee obtained by concentrating a coffee brew, after the acid-bodies fraction has been separated from the ground roasted coffee according to my process, to desired density, with the acid-bodies fraction re-incorporated thereinto. The product so obtained can be kept at room temperature without appreciable alteration for considerably longer times than the 30 to 40% concentrates now on the market which require deep refrigeration. In addition, the higher density of the coffee presents economic advantage in storage, packing, and transporting of the product.

According to my invention, it is also possible to incorporate the acid-bodies fraction, separately isolated and prepared according to my process into dry instant coffees by spraying the acid-bodies fraction, in a finely divided mist, over dry instant coffee. This is possible by virtue of the very high concentration of the acid-bodies fraction which permits its re-incorporation with such dry instant products without appreciably increasing the moisture content thereof.

It is also possible to liquid-liquid extract the acid-bodies aqueous condensate with a suitable volatile solvent, such as alcohols, e.g., ethyl alcohol, or ethers, e.g., methyl ether, or ethyl ether. This solution then can be sprayed onto the dry instant coffee.

In order to more fully understand the nature of my invention, reference will be made at this point to the accompanying drawings showing a suitable apparatus in schematic form, for the practice of the process as will be described hereinafter.

In Figure 1, there is illustrated a general diagram of the process and the outline of apparatus which may be employed, all features of which are not, however, required for each phase of operation.

Figure 2:
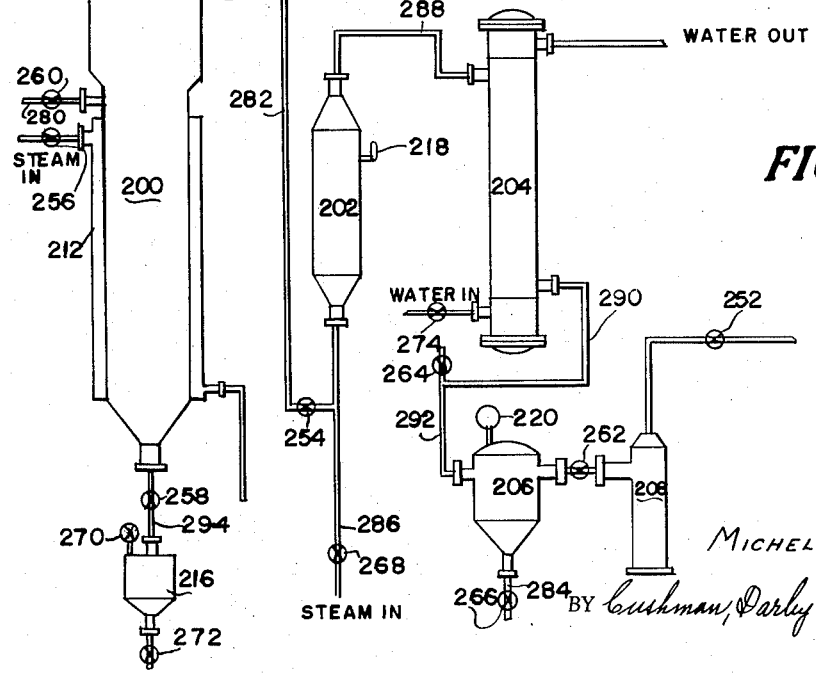

In Figure 2, there is illustrated another form of apparatus suitable for practicing the process of my invention where the acid-bodies fraction is recovered from a coffee brew during the concentration step in the preparation of an instant coffee product.

Figure 3:
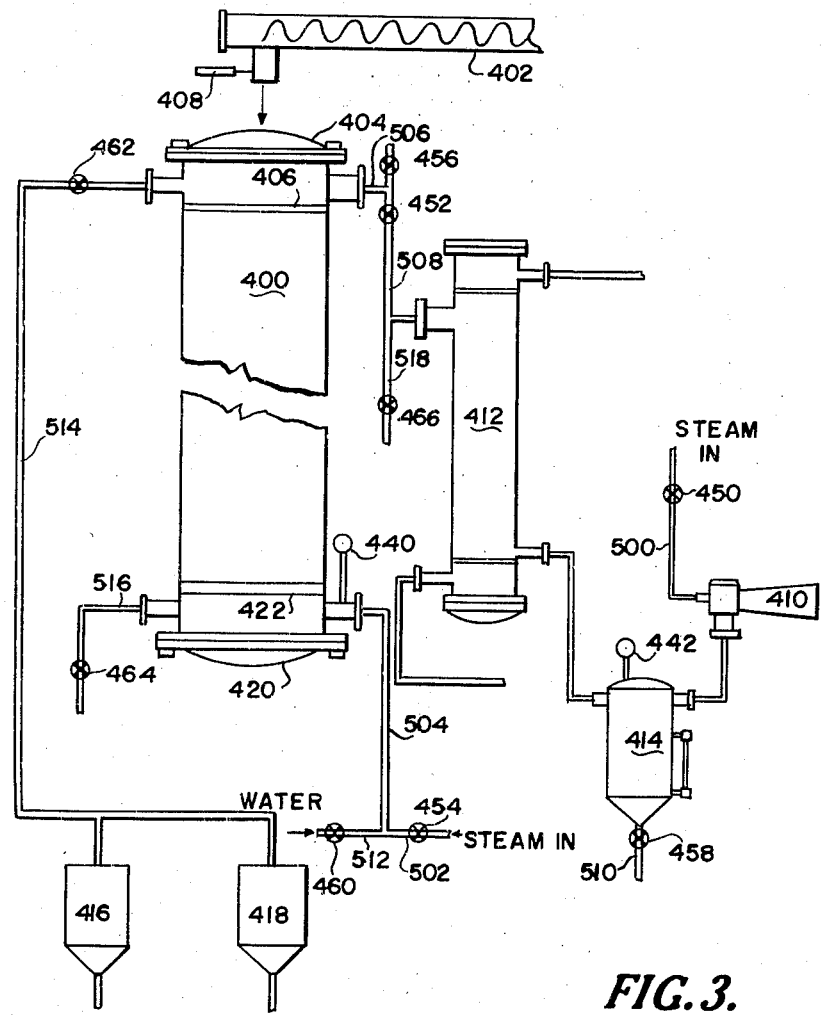

Figure 3 diagrammatically illustrates a coffee factory showing one method of incorporating apparatus which may be used to practice my invention in the over-all scheme of preparing liquid and instant coffee products.

The description of the various elements of the apparatus embodiments illustrated in these figures, and their use in the practice of my invention in its various embodiments, will be apparent from the following examples showing the same.

Example I

This example will illustrate the operation of the process of this invention where an inert gas is used to drive off the acid-bodies fraction from roasted coffee, and then a column of silica gel is used to adsorb it and steam is used to desorb it. The theoretical principle behind the invention will also be illustrated in this example. This embodiment of the invention will be discussed with reference to Figure 1 schematically showing an apparatus arrangement which can be used, although it will be evident from the following description that not all elements of this apparatus are required, the various unused features being shown for convenience in relating the present embodiment to those embodiments in later examples.

Referring then to Figure 1, and starting with all valves closed, 18 pounds of freshly roasted (medium) percolator ground coffee were placed in column 10 which had internal dimensions of approximately 8-in. diameter by 24-in. length. Valves 112, 114, 136, 118, 120, 132, and 128 were opened and nitrogen gas from tank 22 was passed by lines 52 and 54 into column 10 at a rate of about 60 cubic feet per hour as measured by flow meter 106. This gas, with aromatic principles carried with it, is conveyed by lines 62, 70, and 68 into column 12 having a capacity of about 200 cubic centimeters and which contained about 175 grams of silica gel of from 6 to 16 mesh. This operation was continued until an odor of roasted coffee was detected at exit line 94. The column became saturated after the passage of about 880 cubic feet of the mixture of nitrogen and volatiles through it.

The coffee was then removed from column 10, a brew made therefrom, and this concentrated in turn under a pressure of about 1″ Hg to about 64% solids content. The silica gel contained in column 12 was then heated by external means, not shown, until the temperature at thermometer 48 was 140° F. Valves 120 and 128 were then closed and valves 142, 122, and 126 were then opened. Steam was introduced through line 74, at a pressure of 60 p.s.i.g. as measured at gauge 100, and passed through steam superheater 28 in lines 72 and 68 through column 12 and then through lines 66, 76, and 78 into condenser 14 and thereafter by line 82 into receiver 16. The passtage of steam was maintained at a rate and quantity such that 30 cc. of condensate was collected in receiver 16 in thirty seconds. This condensate contained the final desired product, the acid-bodies fraction. It will be noted that a substantial amount of material is recovered in receiver 16 in a short period of time even htough a very small column 12 was used. This material is pumped out through line 90 by opening valve 130.

Before and during this operation, gauge 102 indicated a pressure of 1″ Hg absolute and the temperature at thermometer 48 fell to approximately 125° F. Under these conditions, no water condensation took place in the silica gel contained in column 12. The reduced vacuum pressures were, of course, produced by vacuum pump 20 evacuating the system by lines 86 and 84 connecting Dry Ice trap 18 to receiver 16. It is significant to note that no condensate was collected in the Dry Ice trap 18, indicating that there was no caffeol fraction removed from the silica gel column 12 under the above conditions.

The 30 cc. of condensate obtained as described was then tested organoleptically. No "caffeol" odor was observed, but there was a very peculiar highly concentrated acid taste. To further investigate the characteristics of this concentrate, two separate 6-oz. cups of coffee were made from equal amounts of the 64% liquid instant, obtained as described above, by diluting with water at 200° F. To one of these cups a further two drops (⅕ of a cubic centimeter) of the condensate, hereinafter referred to as the "acid bodies fraction," was added. Both cups of coffee had the aroma of "caffeol," but the cups to which the "acid bodies fraction" had not been added, also had the characteristic flat, watery "instant coffee" taste. By contrast, the cup of coffee to which the "acid bodies fraction" had been added had the full flavor, body, and aroma associated with freshly brewed coffee.

Example II

This example will illustrate the direct removal of the "acid bodies fraction" from the coffee without the use of the silica gel column.

Again referring to Figure 1, starting with all valves closed (but it will again be seen that all elements of the apparatus are not used), a smaller column 10, having a 200 cc. capacity and containing 70 grams of "Silex" grind, "medium" roast coffee was employed. Valves 142, 116, 136, 124, and 126 were opened and steam at 60 p.s.i.g., at gauge 100, were introduced through line 74, superheater 28, lines 72 and 92 through column 10. Before introduction of steam, external heat was applied to column 10 until thermometer 46 read 140° F., and vacuum pump 20 was started so that vacuum gauge 104 indicated a pressure of 1″ Hg. Steam was introduced through line 92 at such a rate that 10 cc. of condensate was collected in 30 seconds at condenser 14, after the steam and volatiles had passed through lines 62, 64, 76, and 78 and collected in receiver 16. Under these conditions, and during operation, thermometer 46 dropped to approximately 125° F., but it will be seen that the temperature was maintained such that no condensation of steam occurred in the ground coffee in column 10. Furthermore, no condensate was collected in Dry Ice trap 18, indicating that no "caffeol" had been removed from the coffee.

As observed in Example I, the 10 cc. of condensate had a peculiar very concentrated acid taste with some burned notes, but there was an absence of "caffeol" odor.

As previously done, the treated coffee grounds were extracted with water and the extract concentrated to a 64% solids liquid instant and the same two-cup test was made. In this case, both cups had a much stronger "caffeol" aroma than in the previous case indicating that in Example I a small portion of the "caffeol" had been driven from the coffee in column 10 and adsorbed and retained by the silica gel in spite of the steam-stripping treatment. The coffee to which the two drops of condensate were added again exhibited the full body and after-taste as well as the aroma of a freshly-brewed cup of coffee.

The significant point to observe with respect to this example is that under the conditions employed, the "caffeol" fraction is left behind in the coffee grounds. Evidently only acidic and aromatic elements other than those constituting a "caffeol" fraction were driven off from the roasted coffee during the 30 seconds' elapsed time. In combination with this observation, it is important to note that the operation was carried out in the presence of only two phases; namely, the solid phase represented by the coffee grounds and the gaseous phase represented by the uncondensed steam and the volatiles in the system. This is true even if a small amount of water is present in the roasted coffee (generally up to about 3%) in a chemically-bound state in the physical structure of roasted coffee.

If this example is repeated under conditions such that condensation of the steam in the body of coffee grounds in column 10 could occur, as, for instance, operation at atmospheric pressure, thereby providing a three-phase system (that is, including a liquid phase), "caffeol" is distilled out of the coffee. Under such operating conditions, more steam is required to strip off the "acid-bodies" fraction and, therefore, a concentrate collected in receiver 16 would be in a much more dilute state. A condensate is also collected in Dry Ice trap 18. It will be understood that with a more dilute product in receiver 16, in adding the desired amount of "acid-bodies fraction" to dry instant or liquid instant coffee, necessarily a greater quantity of water would also be added.

Further experiments following the procedure of this example, but increasing the rate or extending the duration of the steam treatment indicated that nothing is to be gained by such variations. The yield of the "acid-bodies fraction" is not increased and the only modification in the result is an objectionable dilution of the "acid-bodies fraction" recovered in receiver 16. Furthermore, if the treatment is carried out for longer periods, the caffeol fraction will be removed in appreciable quantities, and the quality of the final coffee product thereby impaired.

Example III

This example employs the procedural details and apparatus as used in Example II, except that the vacuum maintained in the system by pump 20 was held at 18" Hg pressure, absolute, and the temperature at thermometer 46 was held at 185° F. These conditions again avoid the condensation of steam in the body of the coffee column 10. In this instance, the "acid-bodies" fraction collected at receiver 16 was slightly different organoleptically from that collected in Example II, and a slightly more burned note was observed. Slight traces of "caffeol" odor were also found in the fraction collected at receiver 16 and the trap 18, but to an insignificant degree.

The usual brew was made as in the previous cases from these coffee grounds steam stripped at 18" Hg pressure and the same two-cup test was made. The coffee brew to which one drop of acid-bodies condensate was added again showed the full flavor and body characteristics associated with freshly brewed coffee, but of a slightly inferior quality to that of Example II.

Example IV

In this example, which is presented for comparative purposes, the procedure of Examples II and III was followed, but the steam introduced by line 74 was at atmospheric pressure and the temperature at thermometer 46 maintained at 220° F., again without permitting condensation to occur in column 10.

An "acid-bodies fraction" was again collected in receiver 16, but as compared to Example III, a somewhat stronger "caffeol" odor was observed. After preparing the 64% liquid instant extract brew from these coffee ground stripped at atmospheric pressure, the two-cup test was repeated and it was observed that the coffee with the added "acid-bodies fraction" was of definite inferior quality to that of Example II and of Example III.

The coffee used in all four of the above examples was a resilient variety, Santos No. 4. The same series of tests was run with a Guatemalan variety of coffee, both varieties being roasted to a degree corresponding to a "medium" roast, the taste preferred by consumers in the Eastern section of the United States.

An identical series of tests was run on a "deep" or so-called "European" roast of a commercial blended coffee (Medaglia d'Oro). From this coffee, the organoleptical qualities of the "acid-bodies fraction" was of the same relative order as that which is obtained from "medium" and "light" roasts but having distinct individual characteristics. A somewhat higher portion of "caffeol" could also be detected and traces of condensate were found in trap 18. This "caffeol-like" odor was, however, completely different from the "caffeol" odor of the "light" and "medium" roast coffees. Again, however, preparation of the instant coffee and cups therefrom showed the same results as previously observed; that is, in the cup with the "acid-bodies fraction" added thereto, a fuller flavor and body, corresponding to that of freshly brewed coffee, was observed.

The results of these last tests indicate the utility of the present invention for the preparation of new characteristic commercial instant coffee blends. That is, the "acid-bodies fraction" from "deep" roast coffees may be added to the extract prepared from "light" or "medium" roast coffees to provide new combinations of aroma and flavor not presently possible in the manufacture of instant coffees.

Example V

This example will illustrate a method of applying the principles of the present invention to the recovery of the acid-bodies fraction from the aromas lost in commercial instant coffee processing.

Referring again to Figure 1, and starting with all valves closed, the aromas and volatiles escaping from equipment such as roaster equipment 30, cooler equipment 32, grinding equipment 34, conveying equipment 36, and extractor equipment 38, are piped through lines 96 and conveyed by the air stream passing through line 80 and produced by fan 44, through air filter 40, through line 60, and thence through silica gel column 12 by opening valves 140, 132, 120, 118, and 144. This is continued until the silica gel in column 12 is saturated with the adsorbed volatiles, and fan 44 is then shut off. At this point, valves 140, 120, 118, and 144 are closed and valves 142, 122, and 126 are opened. Steam is then passed through lines 74, 72, and 68 through column 12 and again condensed in condenser 14 and collected in receiver 16. Before and during this stage, the vacuum produced by pump 20 is preferably held at a pressure of 1" of mercury absolute as measured at gauge 102, and the temperature of the silica gel measured at thermometer 48 is raised to approximately 140° F. by any suitable means, so that condensation of steam in the body of the silica gel is avoided. In practical operation, two silica gel columns may be used alternately with one column in the adsorption operation while the other is undergoing the steam-stripping operation and subsequent silica gel reactivation for return to the adsorption phase. Reactivation of silica gel by heat treatment is, of course, a usual practice well known in the art.

It will be seen from the above description that in this example the aromas and volatiles will be absorbed on the silica gel in column 12 and during the steam-stripping operation the acid-bodies fraction condensate will be recovered in receiver 16. This condensate can then be used as desired in forming later blends of instant coffees.

It has been found advantageous to operate in a reducing atmosphere and for this purpose $SO_2$ gas may be used. Thus, by opening valves 134 and 138, about 3 cc. of $SO_2$, as measured by flow meter 108 may be passed from tank 24 through line 58 to be added to each cubic foot of air passing along line 98 and on into column 12. No traces of $SO_2$ can be found in the acid-bodies condensate. Presumably, the $SO_2$ is not adsorbed by the silica gel or is displaced from it by the acid-bodies vapors.

*Example VI*

As still another method of operation, the silica gel column may be located between the concentrator and the condenser. To illustrate this procedure, reference is made to the apparatus schematically illustrated in Figure 2.

Here coffee brew coming from an extractor is pumped into vacuum concentrator 200. While under vacuum, water is evaporated from this initial brew, which may contain, for instance, about 30% solids, and the water vapor and volatiles are sent through silica gel column 202, condensed in condenser 204 and collected at receiver 206 having a vacuum gauge 220. For this purpose, and assuming all the valves shown are closed, by opening valve 252, steam at the proper pressure is admitted to the ejector 208 which is capable of evacuating the entire system, after valves 262 and 254 are opened, and of such capacity as to evacuate the uncondensable vapors produced during the concentration, and to maintain the vacuum at gauge 210 at a pressure of 1" of mercury, absolute.

By opening valve 256, steam is then introduced into the jacket 212 of concentrator 200, and the motor driving shaft 214 is started. Valve 258 is then opened and the pressure in receiver 216 is equalized with the pressure in the concentrator 200. The system is then ready to receive the coffee extract to be concentrated. Valve 260 is opened and the rate of brew-feed through line 280 is proportional to the initial solids content of the extract entering the concentrator 200 and the final percentage of solids desired in the concentrate at receiver 216, for a given heat surface of the concentrator 200, temperature at jacket 212, and the vacuum as measured by the gauge 210.

The vapors from concentrator 200 are then conveyed to condenser 204 by line 282 through silica gel column 202, which in this case is left at room temperature. At first the temperature of the silica gel in column 202 will rise because of the adsorption of the water vapors, but these are subsequently displaced by the acid-bodies fraction which is retained on the silica gel 202 so that only distilled water and some traces of volatiles are collected in receiver 206. When the silica gel column 202 is saturated with the acid-bodies fraction, valve 260 is closed to cut off the flow of coffee brew to concentrator 200. Valve 262 is then closed, vent valve 264 is opened to break the vacuum, valve 266 is opened, and the water in receiver 206 is withdrawn through line 284 to empty the receiver. Valve 266 is then closed, and valves 254 and 264 are closed and steam is then admitted to line 286 by opening valve 268 and the acid-bodies fraction is carried off of column 202 by line 288 through condenser 204 and by line 290 and 292 into receiver 206, the recovery being fundamentally the same as indicated in Example I, but carried out at atmospheric pressure. The acid-bodies fraction can be withdrawn from receiver 206.

Closing valves 266, 264 and 268 and opening valves 262 and 254 re-establishes the original vacuum in the entire system. Valve 260 can then be opened and the operation resumed and continued until column 202 is again saturated. By installing two columns 202 in parallel, the evaporator may be run without interruption.

Similarly, to withdraw the concentrate delivered to receiver 216 through line 294, valve 258 will be closed, vent valve 270 will be opened, thus breaking the vacuum, and the concentrated coffee extract withdrawn by opening valve 272. Steam in the jacket of concentrator 200 is introduced through valve 256 and water is introduced in the condenser 204 through valve 274.

*Example VII*

To incorporate the present invention into an existing dry instant or liquid instant coffee plant, the only additional pieces of equipment needed are a condenser, a receiver, and a vacuum-producing device such as a steam-ejector, and the related piping and line connections. Referring to Figure 3, the apparatus 400 therein illustrates one of a battery of any number of extractors which can be used. The roasted coffee, ground to a suitable coarseness, is carried into the extractor by means of steam-jacketed conveyor 402 after the cover 404 and screen 406 have been removed. During this conveying period, the coffee may be heated to about 140° F. as measured by thermometer 408. When the charge is completed, screen 406 and cover 404 are replaced and fastened onto extractor 400, which may be steam-jacketed and suitably insulated.

Again starting with all valves closed, by opening valve 450 steam is introduced into line 500 and thence into steam ejector 410, thus starting the evacuation of the system as valve 452 is opened. When a pressure of 1" of mercury absolute is reached at gauge 440, valve 454 is opened and steam introduced through lines 502 and 504 into the bottom of extractor 400 at the desired rate. The 140° F. temperature of the mass of coffee precludes condensation of the steam in the extractor. Steam and volatiles are taken off the top of column 400 through lines 506 and 508 into condenser 412, and the condensate containing the acid-bodies fraction is collected in receiver 414. The duration of the stripping will depend from the mass and coarseness of coffee under treatment. After the desired quantity of condensate is obtained in receiver 414, the steam will be shut off by closing valve 454. After breaking the vacuum in the system by opening valve 456, the steam through ejector 410 is shut off by closing valve 450, and the product may then be withdrawn from receiver 414 through line 510 by opening valve 458.

At this point, the coffee extraction operation may be started. Valve 452 is closed and water at the proper temperature is introduced into the bottom of extractor 400 through line 512 by opening valve 460. When the extractor 400 is filled with liquid, vent valve 456 is closed and the liquid percolated through the coffee grounds by opening valve 462 and passing it through line 514. Instead of water, an extract coming from previous elements of a battery of extractors may be introduced through valve 460 in lines 512 and 504 into extractor 400 to thus obtain a more concentrated extract at either receiver 416, which may be spray drier apparatus to prepare a dry instant coffee, and a receiver 418 for liquid instant coffee. To either of these products, the acid-bodies fraction withdrawn from receiver 414 may be added in any desired proportion to obtain the improved instant coffee provided by this invention.

At the end of the operation, the bottom cover 420 and bottom screen 422 may be removed to empty extractor 400, which can be drained through line 516 by opening valve 464. In addition, the line may be drained through line 518 by opening valve 466 after the extraction operation and before starting the stripping operation. It will be understood that the difference between the reading of the pressure in gauge 440 and gauge 442, which may be observed, will represent the friction loss through the coffee in extractor 400.

The above-described process may be carried out in substantially the same fashion but using a vacuum in the system of 18" of mercury absolute, as previously described in Example III. The process can also be operated at pressures below 1" of mercury absolute, and is conveniently and preferably carried out at the lowest pressure economically feasible. In all instances, however, the temperature of the coffee grounds in extractor 400 is maintained above the condensing temperature of the steam at operating pressures. It is preferred to use superheated steam by incorporating a superheater 28 as shown in Figure 1 in any of the other apparatus embodiments illustrated. The temperature of the coolant out of the condensers is preferably kept 40° to 80° F. below the condensing temperature of the steam under the operating pressures, but not below 33° F.

As the foregoing description indicates, the important features of the operation of my process include the reduced pressure, no greater than about 18″ Hg absolute, for the steam treatment at temperatures above the condensation point of the steam at the pressure employed, i.e., above the condensing temperatures, as indicated in the "Steam Tables." The pressure may be as low as desired, but from present preferred economic considerations the lower limit is desirably about 1″ Hg absolute, more or less. Under these conditions, the acid-bodies-steam condensate has a relatively high concentration and useful composition. The optimum added presence of a reducing gas additive is about 1%, by volume, of the stripping gas stream, but may preferably vary between about 0.3% and about 2.5%. Use of this optional feature improves the quality of the later formed instant concentrate. It is noteworthy that the selective desorption of the acid-bodies achieved under these conditions from the silica gel (the caffeol fraction cannot be removed without using special solvents) is not achieved when other conventional adsorbents are used.

It will be apparent that within the principles disclosed above my invention may be practiced according to various specific arrangements of apparatus and methods of carrying out the individual process steps, including those specifically shown as well as others which will be obvious to one skilled in the art reading this disclosure. Accordingly, my invention is limited only by the spirit and scope of the following claims.

I claim:

1. A process for the separate isolation of the acid-bodies fraction from roasted coffee which comprises: (1) passing dry saturated steam through a particulated solid matter selected from the group consisting of (a) ground roasted coffee beans, and (b) silica gel having said acid-bodies fraction adsorbed thereon under a reduced pressure of at most 18 inches of mercury absolute while maintaining the temperature in excess of the condensation temperature of said steam, and, (2) condensing said steam after passage through said solid particulate matter to obtain a condensate of said acid-bodies fraction.

2. The process of claim 1, including the step of passing sulphur dioxide, along with said dry saturated steam, through said particulated solid matter.

3. Process for the separate isolation of the acid-bodies fraction from roasted coffee beans which comprises: (1) grinding said roasted coffee beans to a particulated state, (2) passing dry saturated steam through the ground coffee beans, (a) under a reduced pressure of at most 18 inches of mercury absolute, (b) while maintaining the temperature in excess of the condensate temperature of said steam, and, (3) condensing said steam after passage through said ground coffee beans to obtain a condensate of said acid-bodies fraction substantially free from other aromatic principles in said roasted coffee beans.

4. Process for the separate isolation of the acid-bodies fraction of roasted coffee beans which comprises: (1) grinding said roasted coffee beans to a particulated state, (2) passing an inert gas through said ground coffee beans to remove the volatile aromatics therefrom, (3) thereafter passing the stream of inert gas containing said volatile aromatics through dry silica gel, until a coffee odor is observed in said gas stream as it exits from said silica gel, (4) thereafter stopping said flow of said inert gas stream through said silica gel and passing dry steam through said silica gel under a reduced pressure of at most 18 inches of mercury absolute while maintaining the temperature in excess of the condensation temperature of said steam, and then, (5) condensing said steam after passage through said solid particulate matter to obtain a condensate of said acid-bodies fraction.

5. The process of claim 4, including the step of passing sulphur dioxide, along with said inert gas, through said ground coffee beans.

6. Process for the separate isolation of the acid-bodies fraction from roasted coffee which comprises: (1) mixing the aromas released during normal coffee processing with sulphur dioxide, (2) conveying the mixture of aromas and sulphur dioxide through silica gel, and, (3) removing the acid-bodies fraction adsorbed on said silica gel by passing dry saturated steam through (a) under reduced pressure of at most 18 inches of mercury absolute, (b) while maintaining the temperature in excess of the condensation temperature of steam, and, (4) condensing said steam after said passage through said silica gel to obtain a condensate of said acid-bodies fraction.

7. Process for the separate isolation of the acid-bodies fraction from roasted coffee which comprises: (1) roasting, grinding, and extracting into an aqueous brew, green coffee beans, (2) subjecting said aqueous brew to reduced pressures to concentrate the same, (3) conveying the vapors released during said concentration under reduced pressure through silica gel, and, (4) removing the acid-bodies fraction adsorbed on said silica gel by passing dry saturated steam through under reduced pressure of from about 1 inch to about 4 inches of mercury absolute while maintaining the temperature in excess of the condensation temperature of said steam, and, (5) condensing said steam after said passage through said silica gel to obtain a condensate of said acid-bodies fraction.

8. Process for the manufacture of an improved instant coffee characterized by having the fully flavored aroma and body of freshly brewed coffee which comprises obtaining a condensate of the acid-bodies fraction of the aromatic principles of roasted coffee, according to the process of claim 7, preparing an instant coffee concentrate in dry or liquid form and thereafter adding said acid-bodies condensate to said instant coffee.

References Cited in the file of this patent

UNITED STATES PATENTS

| | | |
|---|---|---|
| 1,367,726 | Trigg | Feb. 8, 1921 |
| 2,432,759 | Heyman | Dec. 16, 1947 |
| 2,562,206 | Nutting | July 31, 1951 |
| 2,573,406 | Clough et al. | Oct. 30, 1951 |
| 2,680,687 | Lemmonier | June 8, 1954 |
| 2,687,355 | Benner et al. | Aug. 24, 1954 |